Jan. 10, 1950
A. A. GREENBERG
2,494,294
PLURALITY CAPSULE
Filed Dec. 26, 1947
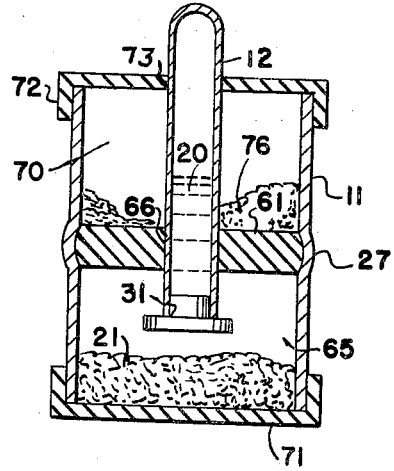
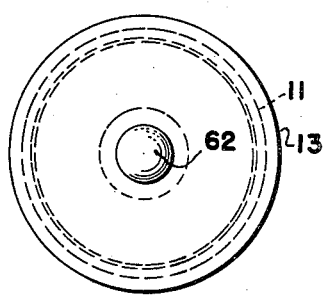
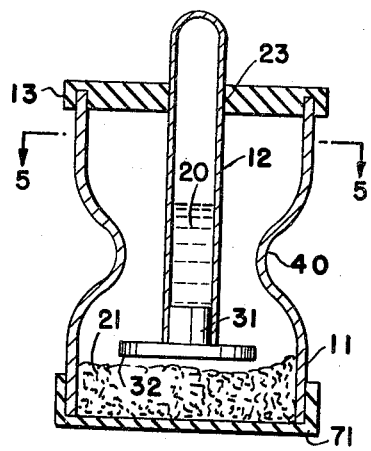
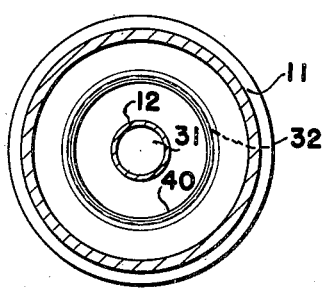
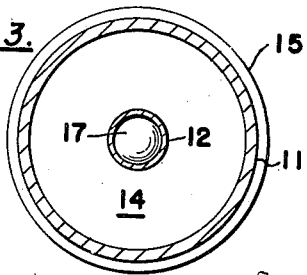
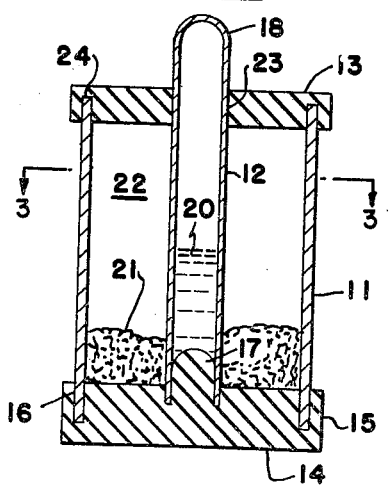
Inventor
ALVIN A. GREENBERG
By Howard J. Whelan.
Attorney Patented Jan. 10, 1950

2,494,294

UNITED STATES PATENT OFFICE 2,494,294

PLURALITY CAPSULE

Alvin A. Greenberg, Baltimore, Md.

Application December 26, 1947, Serial No. 793,856

2 Claims. (Cl. 206—47)

This invention pertains to containers and more particularly to those of a capsule structure for holding small quantities of drugs, chemicals, metals, food products, and cementable materials.

Various ingredients used in the commercial world, are in certain cases combined to form a resulting product, which is the one to be eventually used. The ingredients are necessarily kept separated to prevent chemical action or for other reasons. They are commonly held in different packages to be mixed together at the time of use, on a table or plane surface of some type. Such mixing is done in the open and is subject to unsterilized conditions, contamination by the atmosphere and foreign matter, as well as evaporative and other natural deteriorating effects. This method is slow, requires care, needs skill and involves relatively large amounts of effort. In this invention, it is the purpose to provide a new and improved arrangement that will avoid one or more of the disadvantages and limitations usually entailed in present methods.

Another object of this invention is to provide a new and improved container that will hold several ingredients positively separated from each other, and appropriately enclosed, the container being so made that the means used for separating the ingredients may be eliminated to allow them to join and be mixed with other ingredients without breaking or opening the container, until the resulting product is accomplished thoroughly mixed and ready for use.

A further object of the invention is to provide a new and improved container for ingredients to be used in their combined state that will retain the ingredients enclosed, and separated, until such times as they are intended to be used, at which time the separating means is removed to allow the ingredients to join one another and be mechanically manipulated so as to be intimately mixed and, when in condition to be used may be taken out of the container.

An additional object of this invention is to provide a new and improved container containing quantities of specified ingredients separated from each other but mixable by the predetermined manipulation of the container, without breaking the container itself, and by using an internal implement to stir the ingredients together more intimately until the final product is attained and ready for removal.

Other objects will be evident as the invention is further detailed.

For a clearer appreciation of the principles of this invention and the objects thereof, reference is made to the drawing accompanying the specification herein outlined, which together are intended to illustrate a particular form of the invention by way of example. The claims are made to emphasize the scope of the invention.

Referring to the drawings:

Figure 1 is a plan view of a container for holding several ingredients, structurally formed to embody this invention;

Figure 2 is a vertical section of the container shown in Figure 1;

Figure 3 is a sectional view taken along line 3—3 of Figure 2;

Figure 4 is a modified form of container shown in vertical section;

Figure 5 is a sectional view taken along lines 5—5 of Figure 4; and

Figure 6 is a typical sectional view taken through a modified form of container having three compartments.

Similar reference characters refer to similar parts throughout the drawings.

The particular forms of the invention disclosed herein include preferably a transparent container in which the individual ingredients are loosely disposed and each kind of ingredient is separated by a partition that can be opened to allow the ingredients to join one another. A collar of resilient material is provided in connection with a member in the container adapted to mingle with the mixed ingredients and be agitated therewith. Also the container is preferably made of material not affected by the ingredients, chemically or otherwise, while they are separated.

Referring to Figure 2, a container has an external casing 11 of cylindrical form and is preferably made of transparent material such as glass, or plastic, which is attached or cemented to a circular base 14 having a rim flange 15 and a central portion 17 projecting from said base. The flange 15 provides the surface 16 to which the end portion of the casing 11 is attached or cemented. The opposite end portion of the casing 11 is closed by a collar 13 of rubber or other resilient material, through which an inner tube 12 projects and rests tightly on the portion 17 which fills the open lower end of the tube. The upper end portion 18 of the tube 12 is closed and extends above and outside the collar 13 so it can be held and manipulated by the fingers of the user. An ingredient 20 is placed in the tube 12 before the latter is placed on the central portion 17 to be closed in. The tube can be held upside down for this purpose. The ingredient 21 positioned in the space 22 in the casing 11 outside the tube is closed by the collar 13 and casing wall 11. The collar 13 has an annular groove 24 and a central hole 23 large enough to allow the tube 13 to slip through. The groove 24 sticks the collar 13 to the upper portion of the casing 11 and the hole 23 to the tube 12. This completely seals each set of ingredients in the container and separates them from each other. To use the container and obtain the desired product resulting from the admixture of the ingredients, the tube 12 is raised after wiggling it in the collar 13 sufficiently to loosen it from the central portion 17 of the collar 14. When the tube 12 is raised it is unplugged and allows its contents to flow out and mix with the contents in the space 22 of the casing 11. The tube 12 itself can also be used to help mechanically mix the ingredients by manipulating it in the casing 11. When the mixture produces the desired product, the collar 13 is removed so the product may be removed in any appropriate manner for the use intended.

In the form shown in Figure 4, the casing 11 is constricted to provide a corrugation or contraction at its middle portion 40 which will engage with the flange 32 and pull the plug 31 out of the tube. The stress of pulling the plug 31 out of the tube 12 is therefore placed on the corrugation or contraction 40. In this case the collar 13 can be made thin if desired as it does not have to bear the stress for the plug's removal. The corrugation or contraction may be bent in the wall of the casing for the whole circumference of the casing 11, or simply at two or three or more selected points. The effect will be similar in either instance. The cap 13 is provided with a hole 23 to allow the tube 12 to project therethrough. The lower end of the casing 11 is provided with a cap 71. Ingredients 20 are in the tube and ingredients 21 in the casing.

In the modified form shown in Figure 6, the casing 11 is outwardly bulged at the middle 27 to hold a large supplementary rubber collar 61 which is also perforated to provide a hole 66 through its central portion, through which a tube 12 projects to normally close the hole 66 and allow an opening when it is pulled out. The top collar 72 is similar in construction to that in the other forms and the rod 12 passes through it for manipulation purposes. This tube contains its own ingredient and allows it to escape into the compartment 65 below the supplementary collar 61 as it is raised through the latter and releases the plug 31. When the tube is raised further it clears the opening 66 through which ingredients from the upper compartment 70 can flow into the lower compartment 65 and be mixed therein. The compartment 65 is enclosed at its end by a cap 71 and compartment 70 is enclosed by its cap 72. The cap 72 has a hole 73 through which the tube 12 projects. Ingredients 20 are in the tube and ingredients 21 in the lower compartment 65 and ingredients 76 in the upper compartment 70.

These different forms of the invention afford a quick method of holding various ingredients in a transparent and compact container without contact with each other, until the moment arrives for their mixture or combination. At that moment the tube 12 is lifted to unplug its open end and and allow the contents of all the compartments, whether in the tube or part of the casing, to mix and form the desired resultant product. The method of holding the tube to the collar and base is such as to be detachable without much trouble, but at the same time not being weak enough to allow these parts to become disconnected from ordinary handling and shipping. The ingredients are kept hermetically sealed in their respective compartments and apportioned in proper quantities that can be accurately measured. At the same time the parts may be knocked-down readily when the product is removed. The use of a cellophane or suitable plastic covering over the tube and casing may be included as a matter of conventional practice, and is understood to be applied whether shown or not in the drawings.

While but three general forms of the invention are shown in the drawings and described in the specifications it is not desired to limit this application for patent to these particular forms, as it is appreciated that other forms could be made that would use the same principles and come within the scope of the appended claims.

Having thus described the invention, what is claimed is:

1. A container having side walls and end closures, one of said closures having an opening therein, a tube extending through said opening, said tube having a closed end outside said container and an open end within said container, a removable closure on said open end having a protrusion thereon, and an abutment within said container, said protrusion being of such extent as to contact said abutment when said tube is moved outwardly of said container to remove said closure and open said tube in said container.

2. A container as set forth in claim 1, said abutment consisting of a constriction of the walls of said container.

ALVIN A. GREENBERG.

REFERENCES CITED

The following references are of record in the file of this patent:

UNITED STATES PATENTS

| Number | Name | Date |
|---|---|---|
| 386,696 | Elwell | July 24, 1888 |
| 1,706,335 | Toch | Mar. 19, 1929 |
| 2,268,179 | Benton | Dec. 30, 1941 |